US011671469B1

United States Patent
El Ghazzal

(10) Patent No.: US 11,671,469 B1
(45) Date of Patent: Jun. 6, 2023

(54) RECOMMENDING CONTENT FOR SHARING IN ONLINE MEETINGS

(71) Applicant: Meta Platforms, Inc., Menlo Park, CA (US)

(72) Inventor: Sammy El Ghazzal, Zurich (CH)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/137,059

(22) Filed: Dec. 29, 2020

(51) Int. Cl.
*H04L 65/401* (2022.01)
*H04L 65/1089* (2022.01)
*G06N 20/00* (2019.01)
*H04L 67/306* (2022.01)
*G06F 18/214* (2023.01)

(52) U.S. Cl.
CPC ...... *H04L 65/4015* (2013.01); *G06F 18/2155* (2023.01); *G06N 20/00* (2019.01); *H04L 65/1089* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,961,302 B1 | 5/2018 | Henderson et al. | |
| 11,082,661 B1 | 8/2021 | Pollefeys | |
| 2006/0271877 A1* | 11/2006 | Theurer | G06F 9/451 715/781 |
| 2017/0075890 A1* | 3/2017 | Luna | H04L 67/22 |
| 2017/0323340 A1* | 11/2017 | Jeon | H04L 67/20 |
| 2018/0083907 A1* | 3/2018 | Perlow | H04L 51/22 |
| 2019/0179494 A1* | 6/2019 | Colagrosso | G06Q 10/101 |
| 2020/0382568 A1 | 12/2020 | Krochmal et al. | |
| 2021/0099488 A1* | 4/2021 | Schrager | H04L 67/53 |
| 2021/0224765 A1* | 7/2021 | Siddique | G06Q 10/10 |
| 2021/0365806 A1 | 11/2021 | Sumanth et al. | |

* cited by examiner

*Primary Examiner* — James A Edwards
(74) *Attorney, Agent, or Firm* — Fenwick & West LLP

(57) ABSTRACT

An online system receives, from a client device of a user participating an online meeting, a request to share content with another user participating the online meeting. The online system identifies content items from applications running on the client device. For each identified content item, the online system determines, e.g., by using a trained model or instructing the client device to use the trained model, a sharing score that indicates a likelihood that the user would select the content item to share with the other user. Candidate content items are selected form the identified content items based on the sharing scores. The candidate content items are provided for display to the user in a user interface running on the client device. The user interface allows the user to select one of the candidate content items to share with the other user.

16 Claims, 5 Drawing Sheets

500

Receive, from a client device associated with a first user participating an online meeting, a request to share content with a second user participating the online meeting
510

Identify content items from one or more applications running on the client device
520

For each respective content item of the identified content items, determine a sharing score of the respective content item, the sharing score indicating a likelihood that the first user would select the respective content item to share with the second user
530

Select candidate content items from the identified content items based on the sharing scores for the identified content items
540

Provide the candidate content items for display to the first user in a user interface running on client device, the user interface allowing the first user to select a candidate content item from the candidate content items to share with the second user
550

FIG. 5

RECOMMENDING CONTENT FOR SHARING IN ONLINE MEETINGS

BACKGROUND

This disclosure relates generally to online meetings, and more specifically to content sharing during online meetings.

Online conferencing systems allow people to remotely communicate with each other using audio and visual means. During audio or video calls, it is common that a participant wants to present content running on his/her computer to other participants. However, the user experience of sharing content in conventional online conferencing systems is cumbersome. These online conferencing systems merely provides a list of options to a sharing user that includes all windows/tabs running on the user's computer. The user has to either share the entire screen, which can cause content the user does not want to share become visible to other people, or identify the content that the user wants to share from the list of options. However, the list of options can often times be long, making it harder for the users to timely or correctly identify the content they want to share. Therefore, improved online conferencing systems are needed.

SUMMARY

An online system facilitates online meetings (e.g., audio call, video call, etc.) and provides recommendations of content for sharing to users participating in online meetings. The online system detects content items that are available for a user to share in an online meeting, predicts how likely the user would select to share the content items by using a trained model, generates a list of candidate content items based on the predictions, and provides the list for display to the user for the user to select a content item to share.

For instance, the online system receives, from a client device of a user participating an online meeting, a request to share content with another user participating the online meeting. The online system identifies content items from applications running on the client device. A content item may be an application or a component (e.g., a tab) of an application. For each identified content item, the online system determines a sharing score that indicates a likelihood that the user would select the content item to share with the other user. In some embodiments, the online system determines the sharing score by inputting (or instructing the client device to input) signals into a trained model. The model has been trained to predict likelihoods of users selecting content items to share with other users based on such signals. The signals include, e.g., attributes of content items, information of online meetings, attributes of users, and so on.

The online system selects candidate content items from the identified content items based on their sharing scores and displays the candidate content items in a user interface that allows the user to choose one of the candidate content items to share. In some embodiments, the online system selects content items having relatively high sharing scores or sharing scores above a threshold value as candidate content items. This way, the online system reduces the number of sharing options by filtering out options that are unlikely (or less likely) to be chosen by the user and prevents the user from viewing unnecessarily long list of options. In some embodiments, the online system determines a presenting order of the candidate content items based on their sharing scores. For instance, a candidate content item having a higher sharing score is displayed in front of a candidate content item having a lower sharing score, making it easier for the user to spot the options that the user is more likely to choose. Compared with conventional online conferencing systems, the online system provides a better user experience for sharing content in online meetings.

BRIEF DESCRIPTION OF THE DRAWINGS

FIG. 5 is a flow chart illustrating a method of ranking content items available for sharing in an online meeting, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
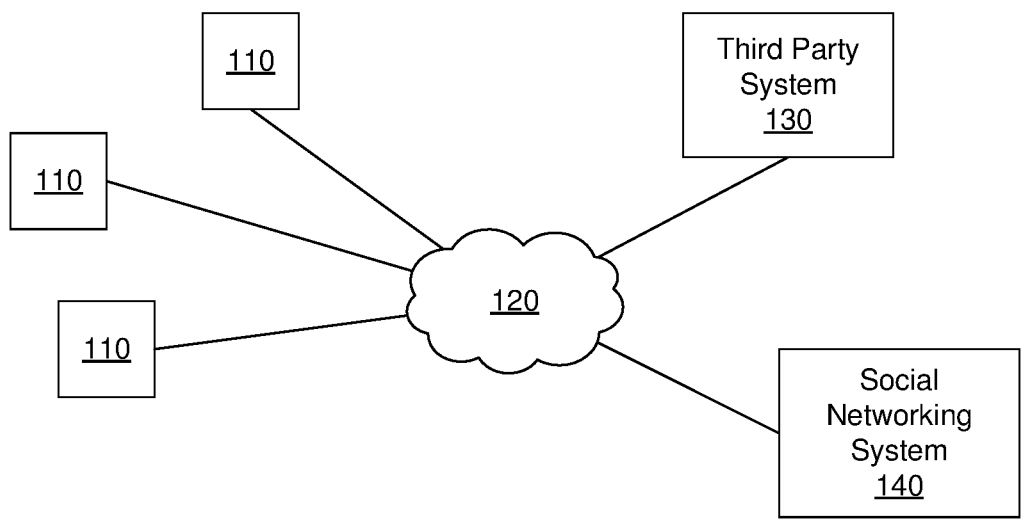
FIG. 1 is a block diagram of a system environment in which an online system operates, in accordance with an embodiment.

FIG. 1 is a block diagram of a system environment 100 in which an online system 140 operates. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

A user can participate in an online meeting by using a client device 110. An online meeting may be an online audio call, video conferencing, or other types of online meetings. The client device 110 is configured to capture video and audio data using an integrated camera and microphone, and sends the captured video and audio data to a client device 110 of another participant of the online meeting to facilitate communications between the user and the other participant. In an embodiment, a client device 110 is an integrated computing device that operates as a standalone network-enabled device. For example, the client device 110 includes display, speakers, microphone, camera, and input device. In another embodiment, a client device 110 is a computing device for coupling to an external media device such as a television or other external display and/or audio output system. In this embodiment, the client device 110 may couple to the external media device via a wireless interface or wired interface (e.g., an HDMI cable) and may utilize various functions of the external media device such as its display, speakers, microphone, camera, and input devices. Here, the client device 110 may be configured to be compatible with a generic external media device that does not have specialized software, firmware, or hardware specifically for interacting with the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
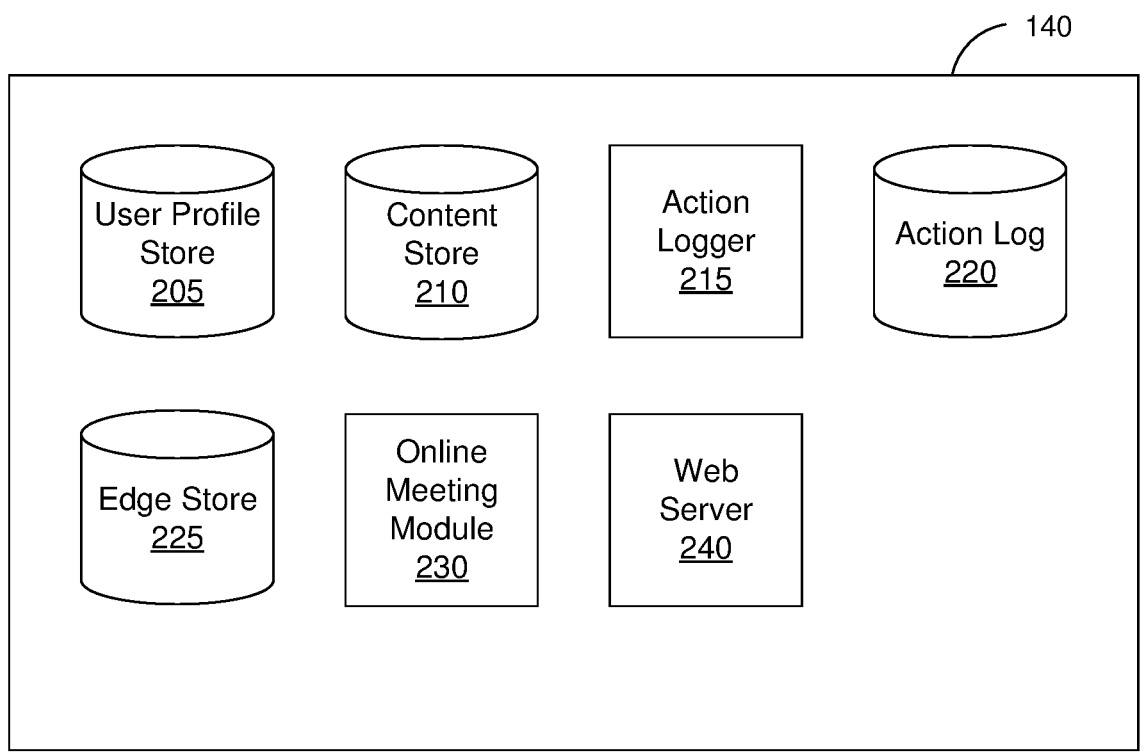
FIG. 2 is a block diagram of an architecture of the online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an online meeting module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The online meeting module 230 facilitates online meetings over the network 120. For example, the online meeting module 230 facilitates connections between client devices 110 of participants of an online meeting when a voice or video call is requested. The online meeting module 230 supports a user interface that allows users to request online meetings, answer (e.g., accept or reject) requests for online meetings, and terminate online meetings. In some embodiments, the online meeting module 230 receives from a client device of a first user a request for an online meeting with a second user and sends a notification of the request to a client device of the second user. In response to an acceptance of the online system received from the client device of the second user, the online meeting module 230 connects the client devices of the two users and allows the client devices to share audio and/or video captured by the microphones and/or cameras associated with the client devices.

During online meetings, the online meeting module 230 allows users to share content items running on their client devices. Content items include, for example, screen, applications, and individual windows. A participant of an online meeting can request to share content with one or more other participants of the online meeting. Such a participant is also referred to as sharing user or presenter. Such request is sent from a client device of the presenter to the online meeting module 230. After receiving the request, the online meeting module 230 identifies content items that are available to share from one or more applications running on the client device. For each identified content item, the online meeting module 230 determines how likely the participant would share the content item, e.g., by using a trained model. In some embodiments, the online meeting module 230 inputs a set of signals to the trained model, the trained model outputs a sharing score of the content item that indicates a likelihood the participant would select the content item to share in the online meeting. The set of signals includes one or more attributes of the content item, information associated with the online meeting, attributes of participants of the online meeting (e.g., one or more attributes of the presenter and/or one or more attributes of participants with whom the presenter share the content item), or some combination thereof.

In some other embodiments, the online meeting module 230 transmits the trained model to the client device of the presenter and instructs the client device to input the set of signals to the trained model and to obtain sharing scores of the content items. In such embodiments, the signals can be collected, stored, and maintained by the client device of the presenter and avoids being shared over the network 120 and thereby helps to protect the presenter's privacy.

Based on the output from the trained model, the online meeting module 230 determines a list of candidate content items for recommending to the presenter. The list is to be displayed to the presenter for the presenter to select a content item to share. In one example, the online meeting module 230 selects content items having sharing score above a threshold value as candidate content items. In another example, the online meeting module 230 ranks the identified content items based on their sharing scores and selects a predetermined number or percentage of highly ranked content items as candidate content items. In some embodiments, the online meeting module 230 determines a listing order for each candidate content item based on the ranking, e.g., the content item having the highest sharing score is the first one in the list, followed by content items having lower sharing scores.

The online meeting module 230 provides the list of candidate content items for display to in a user interface running on the client device of the presenter or instructs the client device to display the list in the user interface. The user interface allows the presenter to select one of the candidate content items to share in the online meeting.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Content Sharing in Online Meeting

Figure 3:
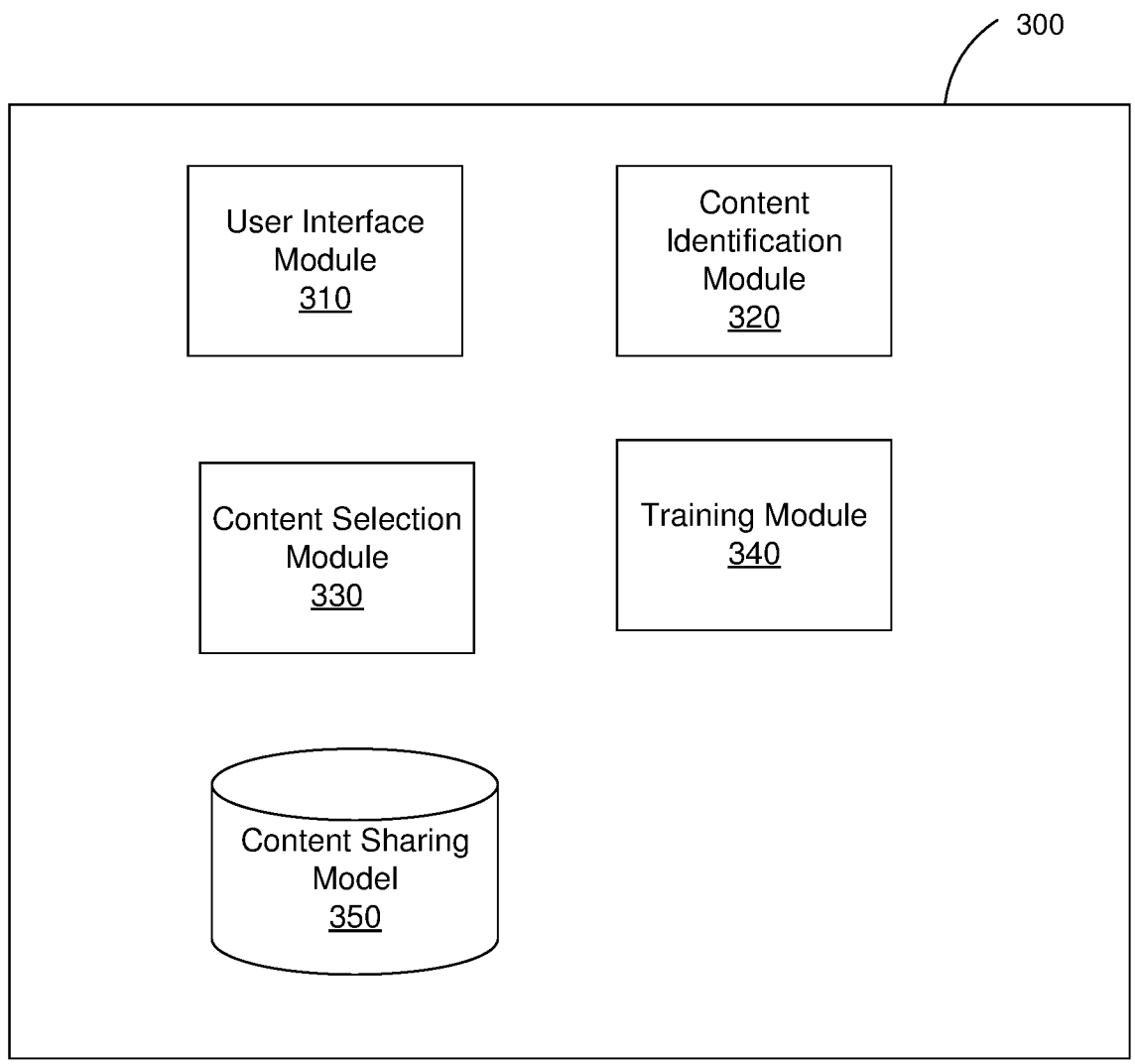
FIG. 3 is a block diagram of an online meeting module, in accordance with an embodiment.

FIG. 3 is a block diagram of an online meeting module 300, in accordance with an embodiment. The online meeting module 300 facilitates online meetings and allows users to share content during online meetings. The online meeting module 300 is an embodiment of the online meeting module 230 in FIG. 2. The online meeting module 300 includes a user interface module 310, a content identification module 320, a content selection module 330, a training module 340, and a content sharing model 350. In other embodiments, the content distribution module 230 may include additional, fewer, or different components for various applications. In some embodiments, some operations of the online meeting module 300 that are described below are performed by client devices of participants of online meetings under instructions from the online meeting module 300.

The user interface module 310 comprises a user interface for online meeting. The user interface includes elements and controls for enabling user interactions associated with online meeting. In an example embodiment, the user interface module 310 includes a calling interface to enable users to make or receive voice and/or video calls. To make a call, the user interface module 310 may provide controls to enable a user to select one or more contacts for calling, to initiate the call, to control various functions during the call, and to end the call. To receive a call, the user interface module 310 may provide controls to enable a user to accept an incoming call, to control various functions during the call, and to end the call. For video calls, the user interface module 310 may include a video call interface that displays remote video from a client 115 together with various control elements such as volume control, an end call control, or various controls relating to how the received video is displayed or the received audio is outputted.

The user interface module 310 also includes a content sharing interface that provides controls to enable users to share content during online meetings. For example, the content sharing interface includes an icon that users can click to request sharing content with another participant in the online meeting. In response to receiving the user's request, the u content sharing interface presents a list of content items to the user as sharing options and allows the user to choose one of the content items to share. After receiving the user's choice, the content sharing interface displays the content item chosen by the user and marked it as being shared.

The content identification module 320 obtains content items that are available to share in online meetings. In some embodiments, the content identification module 320 identifies applications running on the client device of the presenter and identifies the content items from the applications. Examples of the applications include, e.g., web browsers, word processors, presentation programs, data analysis applications, image processing programs, video players, Portable Document Format (PDF) programs, and so on. The content identification module 320 may identify multiple content items from one application. For instance, a web browser includes multiple tabs, and the online system includes each tab as a content item. In some embodiments, the content identification module 320 instructs the client device of the presenter to identify the content items, e.g., by using the method described above, and the client device obtains the content items in accordance with the instruction from the content identification module 320.

The content selection module 330 selects content items from the identified content items as sharing options based on sharing scores of the identified content items. The content selection module 330 determines a sharing score of each identified content item. The sharing score indicates a likelihood that the presenter would select the corresponding content item to share in the online meeting. The content selection module 330 uses the content sharing model 350 to determine sharing scores. The content sharing module 350 has been trained to predict how likely users would select content items to share in online meetings.

In some embodiments, the content selection module 330 inputs content sharing signals into the content sharing model 350 and the content sharing model 350 outputs sharing scores of the content items. The content sharing signals includes one or more attributes of each identified content item, information of the online meeting, one or more attributes of the presenter, one or more attributes of each participant with whom the presenter share content, or some combination thereof. Example attributes of a content item include, e.g., a type of an application from which the content item is identified, an object (e.g., keywords, images, videos, etc.) detected from the content item, a title of the content item, and some combination thereof. The information of the online meeting may include a purpose of the online meeting, a title of the online meeting, keywords in an invitation of the online meeting, information associated with attendees of the online meeting, information associated with content of the online meeting (e.g., salient terms used by the attendees during the online meeting), time of the online meeting, and some combination thereof. The content selection module 330 may instruct the client device of the presenter to obtain attributes of the content items and the information of the online meeting. For example, the content selection module 330 instructs the client device to convert audio of the online meeting to text and to identify salient terms in the text.

Example attributes of the presenter include, e.g., a description of the presenter, a description of an entity associated with the presenter, a relationship between the presenter and one or more other participants of the online meeting, an affinity of the presenter for one or more other participants of the online meeting, and some combination thereof. Example attributes of a participant with whom the presenter share content include, e.g., a description of the participant, a description of an entity associated with the participant, a relationship between the participant and the presenter, an affinity of the participant for the presenter, and some combination thereof. In some embodiments, the presenter and the participant are users of the online system 140. The content selection module 330 retrieves the attributes of the presenter and the participant from the user profile store 205 and/or edge store 225.

The content selection module 330 selects candidate content items form the identified content items based on their sharing scores. In one embodiment, the content selection module 330 selects content items having sharing scores above a threshold value as candidate content items. In other words, content items having sharing scores below the threshold value, indicating that the user is unlikely to share, are filtered out. In another embodiment, the content selection module 330 ranks the identified content items based on their sharing scores and selects a predetermined number or percentage of content items from the identified content items based on the ranking, so that content items having relatively low sharing scores are filtered out. In some embodiments, the content selection module 330 determines a displaying order of the candidate content items based on their sharing scores. For instance, a candidate content item having a higher sharing score is displayed in front of a candidate content item having a lower sharing score, so that content items that the user are more likely to share get the user's attention first.

In some embodiments, the content selection module 330 transmits the content sharing model 350 to the client device of the presenter and instructs the client device of the presenter to input the content sharing signals into the content sharing model 350.

The training module 340 trains the content sharing model 350. The training module 340 applies machine learning techniques to generate the content sharing model 350 that when applied to content sharing signals outputs indications of how likely users would select content items for sharing in online meetings, i.e., sharing scores of content items. As part of the generation of the content sharing model 350, the training module 340 forms a training set by identifying a positive training set of content items that have the property in question, i.e., have been selected by users to share in online meetings, and, in some embodiments, forms a negative training set of content items that lack the property in question.

The training module 340 extracts feature values from the training set, the features being variables deemed potentially relevant to whether or not the content items have the associated property or properties. Specifically, the feature values extracted by the training module 340 include, e.g., attributes of the content items, information of online meetings in which the content items were shared or chosen not to be shared, attributes of presenters and other participants of online meetings, and so on. An ordered list of the features for a content item is herein referred to as the feature vector for the content item. In one embodiment, the training module 340 applies dimensionality reduction (e.g., via linear discriminant analysis (LDA), principle component analysis (PCA), or the like) to reduce the amount of data in the feature vectors for content items to a smaller, more representative set of data.

The training module 340 uses supervised machine learning to train the content sharing model 350, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The content sharing model 350, when applied to the feature vector extracted from a content item, outputs an indication of whether the content item has the property in question, such as a Boolean yes/no estimate, or a scalar value representing a probability.

In some embodiments, a validation set is formed of additional content items, other than those in the training sets, which have already been determined to have or to lack the property in question. The training module 340 applies the trained content sharing model 350 to the content items of the validation set to quantify the accuracy of the content sharing model 350. Common metrics applied in accuracy measurement include: Precision=TP/(TP+FP) and Recall=TP/(TP+FN), where precision is how many the content sharing model 350 correctly predicted (TP or true positives) out of the total it predicted (TP+FP or false positives), and recall is how many the content sharing model 350 correctly predicted (TP) out of the total number of content items that did have the property in question (TP+FN or false negatives). The F score (F-score=2*PR/(P+R)) unifies precision and recall into a single measure. In one embodiment, the training module 340 iteratively re-trains the content sharing model 350 until the occurrence of a stopping condition, such as the accuracy measurement indication that the model is sufficiently accurate, or a number of training rounds having taken place.

In some embodiments, the training module 340 continuously trains the content sharing model 350. For instance, the training module 340 communicates with the user interface module 310 and receives data from the user interface module 310 that indicates the presenter has shared a candidate content items in the online meeting and decided not to share the other candidate content items. The training module 340 labels the candidate content item shared by the presenter as a content item having the property in question while the other candidate content items as not having the property in questions. The training module 340 generates a new training set of the candidate content items that includes the content sharing signals of the candidate content items and the labels. The training module 340 uses the new training set to re-train the content sharing model 350. The training module 340 continues to generate new training sets and re-train the content sharing model 350 as it receives more data from the user interface module 310.

FIGS. 4A-4D illustrate an online meeting interface 400 for online meeting, in accordance with an embodiment. The online meeting interface 400 is an embodiment of the calling interface in the user interface module 310 of FIG. 3. The online meeting interface 400 runs on a computer device 450. The online meeting interface 400 includes a plurality of control elements and display elements that enable users to make or receive voice and/or video calls. As shown in FIGS. 4A-4D, the online meeting interface 400 includes a display element 401 that displays a description of an online meeting between a user/presenter 402 of the computer device 450 and another user 403. It also includes a display element 404 that displays remote video from a client device of the user 403. Additionally, the online meeting interface 400 includes a control element 405 for controlling video of the user 402, a control element 406 for controlling audio of the online meeting, a control element 407 for messaging in the online meeting, a control element 408 for terminating the online meeting, a control element 409 for sharing content.

Figure 4A:
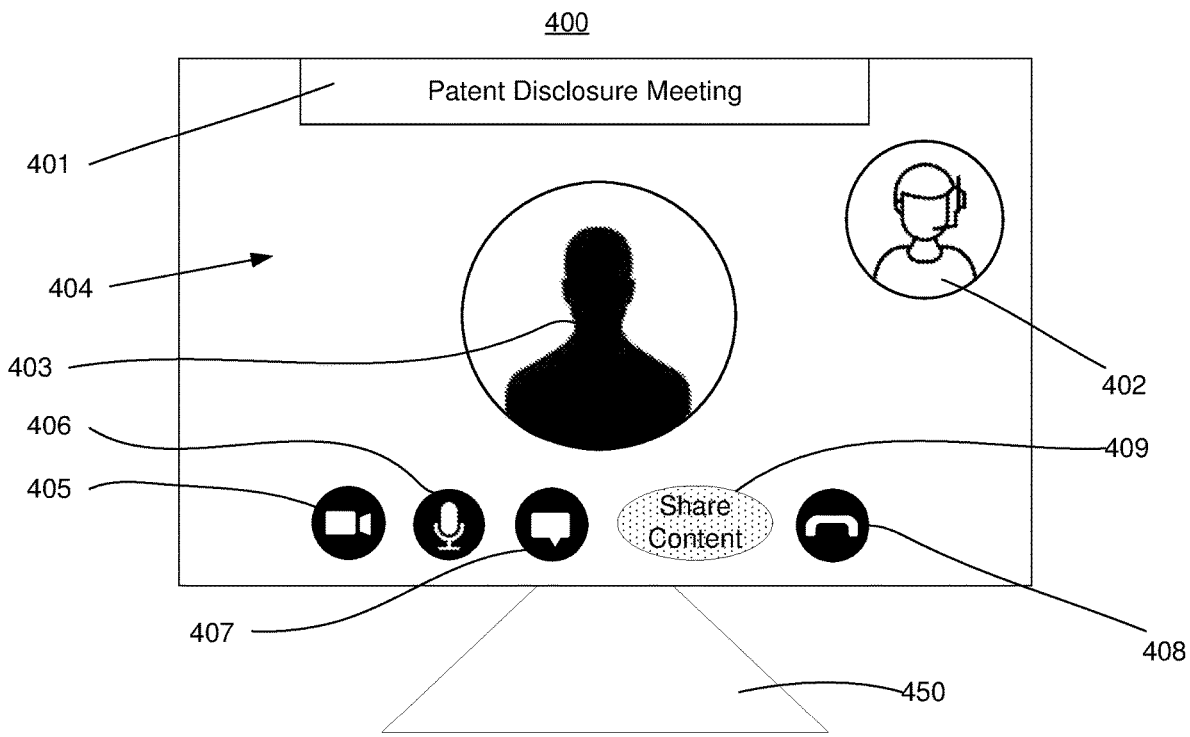
FIGS. 4A-4D illustrate a user interface for online meeting, in accordance with an embodiment.
Figure 4B:
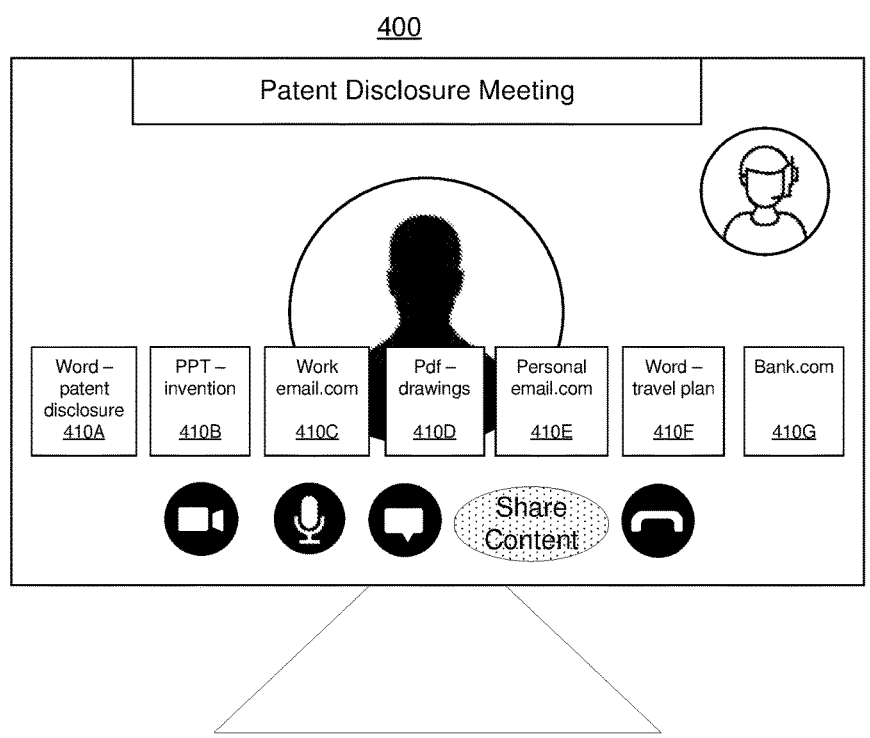

In FIG. 4A, the user 402 clicks the control element 409, e.g., by using an input device of the computer device 450. In response to the click of the control element 409, the online meeting interface 400 in FIG. 4B displays a plurality of content items 410A-G (collectively referred to as "content items 410"). The content items 410 includes a Word® document 410A titled "patent disclosure," a PowerPoint® document 410B titled "invention," a webpage 410C for a work email account, a pdf 410D titled "drawings", another webpage 410E for a personal email account, another Word® document 410F titled "travel plan," and another webpage 410F for an online bank account. The content items 410 are identified from applications running on the computer device 450. Multiple content items can be identified from a single application. For instance, the webpages 410C, 410E, and 410F are identified from a web browser running on the compute device 450 as three tabs of the web browser. In some embodiments, the content items 410 are selected from a pool of content items identified from the computer device 450 based on sharing scores indicating how likely the user 402 would select the content items 410 to share with the user 403. For instance, a content item is identified from a chatting application running on the computer device 450, but because the sharing score of the content item is lower than a threshold value or lower than a predetermined number of other content items, the content item is not presented in the online meeting interface 400. In some embodiments, the content items 410 are displayed in an order that is determined based on their sharing scores.

The sharing scores are determined by a model trained to make predictions of how likely users select content items to share with other users in online meetings. Attributes of the content items 410, information of the online meeting, and/or attributes of the users 402 and 403, which are potentially relevant to the prediction, are inputted to the trained model, and the trained model outputs the sharing scores. Attributes of the content items include titles of the Word® documents 410A and 410F, title of the PowerPoint® document 410B, title of the PDF document 410D, URLs of the webpages 410C, 410E, and 410G. Attributes of the content items may also include information that is not shown in FIG. 4A, such as keywords, images, salient terms, etc. in the content items

410. Information of the online meeting includes the title of the online meeting ("patent disclosure meeting"), keywords in the invitation of the online meeting, the start/end time of the online meeting, temporal duration of the online meeting, and so on. In some embodiments, the information of the online meeting includes salient terms detected from the audio/video of the computer device 450 and/or the client device of the user 403. Attributes of the user 402 or 403 includes a description (e.g., job, title, etc.) of the user, an entity associated with the user, relationship between the users (e.g., personal relationship or professional relationship), affinity of one user for the other user, and so on. The attributes of the users may be retrieved from the online system 140.

Figure 4C:
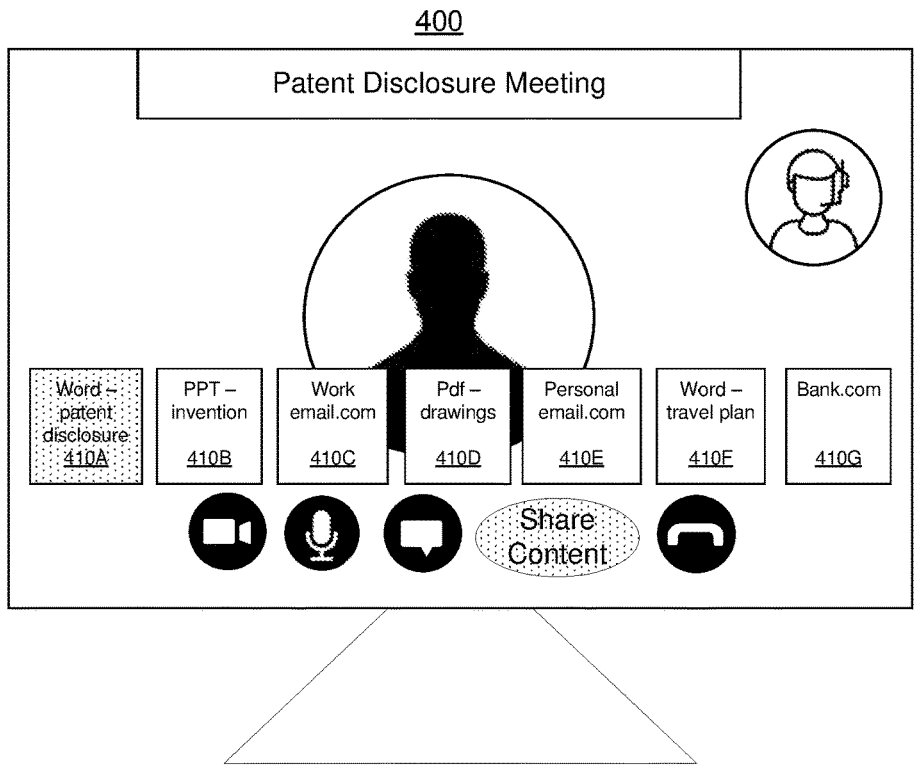
Figure 4D:
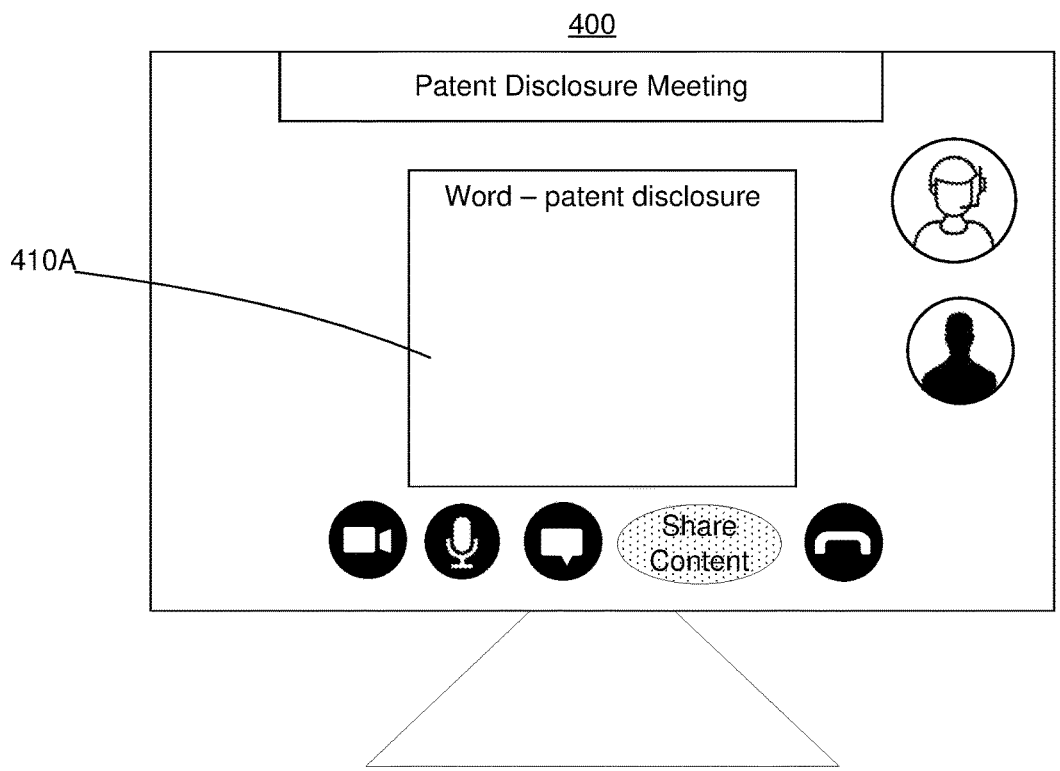

The online meeting interface 400 allows the user 402 to select one of the displayed content items to share with the user 403. In FIG. 4C, the user 402 selects the content item 410A. In response to the selection of the content item 410A by the user 402, the online meeting interface 400 displays the content item 410 in the display element 404 and moves the remove video from the client device of the user 403. In some embodiments, the online meeting interface 400 transmits information indicating the selection of the content item 410A by the user 402 and un-selection of the content items 410B-G to a training module. The training module then uses the information from the online meeting interface 400 and the content sharing signals to further train the model.

FIG. 5 is a flow chart illustrating a method 500 of ranking content items available for sharing in an online meeting, in accordance with an embodiment. The method is performed by the online meeting module 230.

The online meeting module 230 receives 510, from a client device associated with a first user participating an online meeting, a request to share content with a second user participating the online meeting. In response to the request, the online meeting module 230 identifies 520 content items from one or more applications running on the client device. In some embodiments, the online meeting module 230 selects the one or more applications from a plurality of processes running on the first client device. The online meeting module 230 then identifies one or more files from each application of the one or more applications, each of the one or more files being one of the identified content items.

For each respective content item of the identified content items, the online meeting module 230 determines 530 a sharing score of the respective content item. The sharing score indicates a likelihood that the first user would select the respective content item to share with the second user. In some embodiments, the online meeting module 230 inputs at least one or more attributes of the respective content item into a model. The model has been trained to predict likelihoods of users selecting content items to share with other users based at least on attributes of the content items. The one or more attributes of the respective content item are selected from a group consisting of: a type of an application from which the respective content item is identified, an object detected from the respective content item, a title of the respective content item, and some combination thereof.

In some embodiment, the online meeting module 230 also inputs information associated with the online meeting into a model to determine the sharing score. The information associated with the online meeting is selected from a group consisting of: a purpose of the online meeting, a title of the online meeting, information associated with an invitation of the online meeting, information associated with attendees of the online meeting, information associated with content of the online meeting; time of the online meeting, and some combination thereof.

In addition to the one or more attributes of the respective content item and information associated with the online meeting, the online meeting module 230 may also input an attribute of the first use and an attribute of the second user into the model to determine the sharing score. The first user and second user are users of an online system (such as the online system 100). The online system maintains a first user profile for the first user and a second user profile for the second user. The online meeting module 230 determines the attribute of the first user based on the first user profile and determines the attribute of the second user based on the second user profile. The attribute of the first or second user is selected from a group consisting of: a description of the user, a description of an entity associated with the user, a relationship between the two users, an affinity of the first user for the second user or vice versa in the online system, and some combination thereof.

In one embodiment, the model outputs the sharing score of the respective content item. In another embodiment, the model outputs a probability that the first user would select the respective content item to share with the second user and the online meeting module 230 determines the sharing score of the respective content item. In some embodiments, the online meeting module 230 provides the model to the client device and instructs the client device to use the model to determine the sharing scores of the content items.

The online meeting module 230 selects 540 candidate content items from the identified content items based on the sharing scores for the identified content items. The online meeting module 230 provides 550 the candidate content items for display to the first user in a user interface running on client device, the user interface allowing the first user to select a candidate content item from the candidate content items to share with the second user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising,
receiving, from a first client device associated with a first user participating in an online video call, a request to share an application running on the first client device associated with the first user during the video call with a second user participating in the online video call, wherein the first user and second user are users of an online system that maintains a first user profile for the first user and a second user profile for the second user;
identifying one or more applications running on the first client device;
for each of the one or more applications running on the first client device, determining a sharing score indicating a likelihood that the first user would select the respective application to display to the second user in response to being presented with a user interface option for sharing the respective application, wherein determining the sharing score of the respective application comprises:
  determining an attribute of the first user based on the first user profile;
  determining an attribute of the second user based on the second user profile
  inputting the attribute of the first user, the attribute of the second user, and at least one or more attributes of the respective application into a model, the model trained to predict likelihoods of users selecting applications to share with other users based at least on attributes of the applications; and
  determining the sharing score of the respective application based on an output of the model;
ranking the one or more applications based on the sharing scores for the identified one or more applications; and
providing the one or more applications for display to the first user in a user interface running on the first client device associated with the first user, where the user interface arranges the one or more applications based on the ranking, the user interface allowing the first user to select an application operating on the first client device associated with the first user from the one or more applications to display to the second user during the online video call.

2. The method of claim 1, wherein the one or more attributes of the respective application comprise one or more of: a type of an application from which the respective application is identified, an object detected from the respective application, a title of the respective application, or some combination thereof.

3. The method of claim 1, wherein the attribute of the first user comprises one or more of: a description of the first user, a description of an entity associated with the first user, a relationship between the first user and the second user, an affinity of the first user for the second user in the online system, or some combination thereof.

4. The method of claim 1, wherein inputting at least one or more attributes of the respective application into a model comprises:
inputting the one or more attributes of the respective application and information associated with the online video call into the model.

5. The method of claim 4, wherein the information associated with the online video call comprises one or more of: a purpose of the online video call, a title of the online video call, information associated with an invitation of the online video call, information associated with attendees of the online video call, information associated with content of the online video call; time of the online video call, or some combination thereof.

6. The method of claim 1, wherein identifying applications from one or more applications running on the first client device comprises:
selecting the one or more applications from a plurality of processes running on the first client device; and
identifying one or more files from each application of the one or more applications, each of the one or more files being one of the identified applications.

7. The method of claim 1, wherein providing the one or more applications for display to the first user in a user interface running at the first client device comprises:
determining an order of presenting the one or more applications based on the likelihoods of the one or more applications; and
providing the one or more applications for display in the determined order.

8. The method of claim 1, further comprising:
further training the model based on the one or more attributes of each respective application and whether the respective application was selected by the first user.

9. A computer program product comprising a non-transitory computer-readable storage medium containing computer program code for:
receiving, from a first client device associated with a first user participating in an online video call, a request to an application running on the first client device associated with the first user during the video call with a second user participating in the online video call, wherein the first user and second user are users of an online system that maintains a first user profile for the first user and a second user profile for the second user;

identifying one or more applications running on the first client device;

for each of the one or more applications running on the first client device, determining a sharing score indicating a likelihood that the first user would select the respective application to display to the second user in response to being presented with a user interface option for sharing the respective application, wherein determining the sharing score of the respective application comprises:

determining an attribute of the first user based on the first user profile;

determining an attribute of the second user based on the second user profile inputting the attribute of the first user, the attribute of the second user, and at least one or more attributes of the respective application into a model, the model trained to predict likelihoods of users selecting applications to share with other users based at least on attributes of the applications; and determining the sharing score of the respective application based on an output of the model;

ranking the one or more applications based on the sharing scores for the identified one or more applications; and providing the one or more applications for display to the first user in a user interface running on the first client device associated with the first user, where the user interface arranges the one or more applications based on the ranking, the user interface allowing the first user to select an application operating on the first client device associated with the first user from the one or more applications to display to the second user during the online video call.

10. The computer program product of claim 9, wherein the one or more attributes of the respective application comprise one or more of: a type of an application from which the respective application is identified, an object detected from the respective application, a title of the respective application, or some combination thereof.

11. The computer program product of claim 9, wherein the attribute of the first user comprises one or more of: a description of the first user, a description of an entity associated with the first user, a relationship between the first user and the second user, an affinity of the first user for the second user in the online system, or some combination thereof.

12. The computer program product of claim 9, wherein inputting at least one or more attributes of the respective application into a model comprises:

inputting the one or more attributes of the respective application and information associated with the online video call into the model.

13. The computer program product of claim 12, wherein the information associated with the online video call comprises one or more of: a purpose of the online video call, a title of the online video call, information associated with an invitation of the online video call, information associated with attendees of the online video call, information associated with content of the online video call; time of the online video call, or some combination thereof.

14. The computer program product of claim 9, wherein identifying applications from one or more applications running on the first client device comprises:

selecting the one or more applications from a plurality of processes running on the first client device; and identifying one or more files from each application of the one or more applications, each of the one or more files being one of the identified applications.

15. The computer program product of claim 9, wherein providing the one or more applications for display to the first user in a user interface running at the first client device comprises:

determining an order of presenting the one or more applications based on the likelihoods of the one or more applications; and providing the one or more applications for display in the determined order.

16. The computer program product of claim 9, wherein the non-transitory computer-readable storage medium further contains computer program code for:

further training the model based on the one or more attributes of each respective application and whether the respective application was selected by the first user.

* * * * *